United States Patent
Hashimoto et al.

(10) Patent No.: US 9,963,148 B2
(45) Date of Patent: May 8, 2018

(54) CONTROL DEVICE AND CONTROL METHOD FOR VEHICLE

(71) Applicant: TOYOTA JIDOSHA KABUSHIKI KAISHA, Toyota-shi, Aichi-ken (JP)

(72) Inventors: Hiroto Hashimoto, Susono (JP); Akira Murakami, Gotemba (JP); Hiroaki Kimura, Toyota (JP); Tomohito Ono, Susono (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 0 days. days.

(21) Appl. No.: 15/457,286

(22) Filed: Mar. 13, 2017

(65) Prior Publication Data

US 2017/0267246 A1    Sep. 21, 2017

(30) Foreign Application Priority Data

Mar. 15, 2016 (JP) .................. 2016-050693

(51) Int. Cl.
*B60W 30/18* (2012.01)
*F16H 48/34* (2012.01)
(Continued)

(52) U.S. Cl.
CPC ......... *B60W 30/18118* (2013.01); *B60K 6/26* (2013.01); *B60K 6/365* (2013.01); *B60K 6/38* (2013.01); *B60K 6/383* (2013.01); *B60K 6/445* (2013.01); *B60K 6/46* (2013.01); *B60W 10/08* (2013.01); *B60W 10/115* (2013.01); *B60W 10/182* (2013.01); *B60W 10/184* (2013.01); *B60W 10/196* (2013.01);
(Continued)

(58) Field of Classification Search
CPC ........ B60W 30/18; F16H 48/34; G03G 15/01; B63H 5/125
See application file for complete search history.

(56) References Cited

U.S. PATENT DOCUMENTS 5,583,630 A * 12/1996 Kimura ............... F16D 3/04
399/227
6,071,157 A * 6/2000 Yoshino ............... B63H 20/10
440/61 D (Continued)

FOREIGN PATENT DOCUMENTS

| JP | 2009-120043 A | 6/2009 |
| JP | 2017-035991 A | 2/2017 |
| WO | 2013/140527 A1 | 9/2013 |

*Primary Examiner* — Yuri Kan
(74) *Attorney, Agent, or Firm* — Hunton Andrews Kurth LLP

(57) ABSTRACT

A control device for a vehicle is provided. The control device includes an electronic control unit that is configured to: exert the torque of an input member on a fixed member and a rotating member such that the fixed member and the rotating member are separated from each other, when the thrust is exerted for making the engagement teeth mesh with each other; estimate an inclination angle of tooth surfaces based on a relative movement amount between the fixed member and the rotating member, and a relative rotational amount between the fixed member and the rotating member; estimate a frictional coefficient of the tooth surfaces based on the inclination angle; and control the thrust of the actuator according to the frictional coefficient.

8 Claims, 9 Drawing Sheets

(51) Int. Cl.

| | | |
|---|---|---|
| *G03G 15/01* | (2006.01) | |
| *B63H 5/125* | (2006.01) | |
| *B60K 6/26* | (2007.10) | |
| *B60K 6/365* | (2007.10) | |
| *B60K 6/383* | (2007.10) | |
| *B60K 6/46* | (2007.10) | |
| *B60W 10/08* | (2006.01) | |
| *B60W 10/115* | (2012.01) | |
| *B60W 10/18* | (2012.01) | |
| *B60W 10/184* | (2012.01) | |
| *B60W 20/10* | (2016.01) | |
| *B60K 6/38* | (2007.10) | |
| *B60K 6/445* | (2007.10) | |
| *B60W 10/196* | (2012.01) | |
| *B60W 20/00* | (2016.01) | |
| *B60W 30/184* | (2012.01) | |
| *F16D 7/04* | (2006.01) | |
| *F16D 27/09* | (2006.01) | |
| *F16D 63/00* | (2006.01) | |
| *B60W 50/00* | (2006.01) | |

(52) U.S. Cl.
CPC ............ *B60W 20/00* (2013.01); *B60W 20/10* (2013.01); *B60W 30/1846* (2013.01); *F16D 7/044* (2013.01); *F16D 27/09* (2013.01); *F16D 63/006* (2013.01); *B60K 2006/381* (2013.01); *B60W 2050/0088* (2013.01); *B60W 2510/08* (2013.01); *B60W 2510/083* (2013.01); *B60W 2510/186* (2013.01); *B60W 2510/188* (2013.01); *B60W 2520/10* (2013.01); *B60W 2520/28* (2013.01); *B60W 2520/30* (2013.01); *B60W 2710/08* (2013.01); *B60W 2710/188* (2013.01); *B60W 2720/10* (2013.01); *B60W 2720/28* (2013.01); *B60W 2720/30* (2013.01); *B60Y 2200/92* (2013.01); *Y02T 10/6239* (2013.01); *Y02T 10/7258* (2013.01); *Y10S 903/93* (2013.01); *Y10S 903/947* (2013.01)

(56) References Cited

U.S. PATENT DOCUMENTS

| | | |
|---|---|---|
| 2015/0040720 A1 | 2/2015 | Kitabatake et al. |
| 2016/0097443 A1* | 4/2016 | Larsson ................ F16H 48/34 |
| | | 475/150 |
| 2017/0043656 A1 | 2/2017 | Hashimoto et al. |

* cited by examiner

_(54)_ CONTROL DEVICE AND CONTROL METHOD FOR VEHICLE

INCORPORATION BY REFERENCE

The disclosure of Japanese Patent Application No. 2016-050693 filed on Mar. 15, 2016 including the specification, drawings and abstract is incorporated herein by reference in its entirety.

BACKGROUND

1. Technical Field

The present disclosure relates to a control device and a control method for a vehicle that transmit the torque output from a drive power source to a drive wheel.

2. Description of Related Art

A drive device of a hybrid vehicle having an engine, a first motor, and a second motor as drive power sources is described in Japanese Patent Application Publication No. 2009-120043 (JP 2009-120043 A). The drive device of the hybrid vehicle described in this JP 2009-120043 A is equipped with a power split mechanism that transmits the output torque of the engine and the first motor to a drive wheel side. The power split mechanism is constituted by a single pinion type planetary gear mechanism. The engine is coupled to a carrier of the planetary gear mechanism, the first motor is coupled to a sun gear, and an output member that transmits power to a drive wheel is coupled to a ring gear. In this hybrid vehicle, driving can be performed by selectively setting an electric driving mode in which the power output from at least one of the first motor and the second motor in a state where the engine is stopped is transmitted to the drive wheel, a regenerative driving mode in which at least any of the first motor or the second motor is made to function as a generator, and an engine driving mode in which the power output from the engine is transmitted to the drive wheel. Additionally, the drive device of the hybrid vehicle described in this JP-2009-120043 A is equipped with an engagement type clutch (locking mechanism) for stopping and fixing the rotation of the engine in the above electric driving mode. The engagement type clutch is disposed inside a case that houses the first motor, the second motor, the power split mechanism, and the like.

Additionally, a transmission for a vehicle equipped with a shifting mechanism to which engine torque is input via an input shaft of the transmission, and a torque limiter disposed between the input shaft of the transmission and the engine is described in International Publication No. WO2013/140527. The torque limiter is configured so as to allow torque to be transmitted between the input shaft of the transmission and an engine output shaft and inhibit a larger surplus torque than a predetermined torque from being transmitted between the input shaft of the transmissions and the engine output shaft. The transmission for a vehicle described in this International Publication No. WO2013/140527 is mounted on the hybrid vehicle having the engine, the first motor, and the second motor as the drive power sources, similar to JP 2009-120043 A. A one-way clutch or a dog clutch is provided as an engaging mechanism that allows the normal rotation of the engine output shaft and prevents the reverse rotation of the engine output shaft.

According to the drive device of the hybrid vehicle described in the above JP 2009-120043 A, when motor driving is performed in the electric driving mode, the drag loss of the engine during the motor driving can be reduced by actuating the locking mechanism to stop (lock) the rotation of the engine. Additionally, in a case where the motor driving is performed with high output by the output torque of both the first motor and the second motor, the output torque of the first motor can be efficiently transmitted to the output member via the power split mechanism in which the rotation of the carrier is locked, together with the engine. In the drive device of the hybrid vehicle described in JP 2009-120043 A, for example, if the dog clutch that is described in the above International Publication No. WO2013-140527 is applied, the input of the excessive torque in the power transmission path between the drive wheel and the engine can be suppressed.

SUMMARY

In a case where the above dog clutch is applied to the drive device of the above hybrid vehicle and the locking function and the limiting function are made compatible with each other, the frictional coefficient in the contact surfaces of the engagement teeth in the dog clutch influences a limit torque (upper limit torque). Therefore, the frictional coefficient becomes an important factor. However, the angle of tooth surfaces in engagement surfaces of the dog clutch varies with aged deterioration or the like. For that reason, if the above frictional coefficient is estimated using an initial value at the time of designing or the like, deviation or an error may occur in the frictional coefficient estimated with the aged deterioration. As a result, the locking function and the limiting function may decrease.

The disclosure provides a control device and a control method for a vehicle equipped with a locking function of locking rotation of prime movers, such as an engine and a motor, and a limiting function capable of appropriately inhibiting an excessive torque from acting on a power transmission path.

A first aspect of the disclosure provides a control device for a vehicle. The vehicle includes an engaging mechanism. The engaging mechanism includes a fixed member, a rotating member, engagement teeth, an actuator, and an input member. The rotating member is disposed to face the fixed member on the same axis as the fixed member. The fixed member and the rotating member are configured to mesh with each other to transmit torque. The fixed member and the rotating member are configured to be separated relative to each other in an axis direction such that the meshing between the engagement teeth is released and the transmission of the torque is cut off, when a torque equal to or higher than an upper limit torque capable of being transmitted between the fixed member and the rotating member is input to the rotating member. The engagement teeth are respectively provided on mutually facing surfaces of the fixed member and the rotating member. The engagement teeth have shapes that are tapered toward the mutually facing surfaces. The actuator is configured to generate thrust in a direction in which the fixed member and the rotating member are made to approach each other such that the engagement teeth mesh with each other. The input member is configured such that torque is input to the rotating member. The control device includes an electronic control unit. The electronic control unit is configured to control the torque of the input member to act on the fixed member and the rotating member such that the fixed member and the rotating member are separated from each other in the axis direction by the input member, when the thrust is exerted on at least one of the fixed member and the rotating member by the actuator so as to make the engagement teeth mesh with each other. The electronic control unit is configured to estimate an inclination angle of tooth surfaces based on a relative movement amount in the axis direction between the fixed member and the rotating member, and a relative rotational amount between the fixed member and the rotating member. The electronic control unit is configured to estimate a frictional coefficient of the tooth surfaces based on the inclination angle. The electronic control unit is configured to control the thrust of the actuator according to the frictional coefficient.

In the above control device, the electronic control unit may be configured to estimate the frictional coefficient, based on the estimated inclination angle of the tooth surfaces, the thrust generated by the actuator, and torque acting on the fixed member and the rotating member.

In the above control device, the electronic control unit may be configured to lower the torque acting on the fixed member and the rotating member, when the relative movement amount in the axis direction between the fixed member and the rotating member exceeds a predetermined value.

The vehicle may further include a planetary gear mechanism, a drive wheel, a brake mechanism, a first motor, and a second motor. The planetary gear mechanism may include at least three rotation elements of a first rotation element to which the first motor is coupled, a second rotation element to which the rotating member is coupled, and a third rotation element coupled to the drive wheel. The brake mechanism may be configured to exert braking torque on the drive wheel. The second motor may be coupled to a power transmission path between the drive wheel and the third rotation element. In the above control device, the electronic control unit may be configured to estimate the frictional coefficient when torque from the first motor is output while the braking torque is exerted on the drive wheel by the brake mechanism when the frictional coefficient is estimated. The electronic control unit may be configured to control the output torque of the second motor such that torque opposing the torque transmitted to the third rotation element is transmitted to the third rotation element by outputting torque from the first motor, when the electronic control unit estimates the frictional coefficient.

The brake mechanism may be a parking lock mechanism configured to lock a rotating body within the power transmission path between the third rotation element and the drive wheel. In the above control device, the electronic control unit may be configured to stop the control of the output torque of the second motor, when a shift position is a parking position where the parking lock mechanism is actuated.

In the above control device, the electronic control unit may be configured to execute hill-hold brake control for maintaining a braking force exerted on the drive wheel by the brake mechanism at a predetermined braking force or higher. The electronic control unit may be configured to stop the control of the output torque of the second motor when the hill-hold brake control is executed.

In the above control device, the electronic control unit may be configured to stop control for estimating the frictional coefficient, when a driving request for the vehicle is required during execution for the control of estimating the frictional coefficient.

A second aspect of the disclosure provides a control method for a vehicle. The vehicle includes an engaging mechanism. The engaging mechanism includes a fixed member, a rotating member, engagement teeth, an actuator, and an input member. The rotating member is disposed to face the fixed member on the same axis as the fixed member. The fixed member and the rotating member are configured to mesh with each other to transmit torque. The fixed member and the rotating member are configured to be separated relative to each other in an axis direction such that the meshing between the engagement teeth is released and the transmission of the torque is cut off, when a torque equal to or higher than an upper limit torque capable of being transmitted between the fixed member and the rotating member is input to the rotating member. The engagement teeth are respectively provided on mutually facing surfaces of the fixed member and the rotating member. The engagement teeth have shapes that are tapered toward the mutually facing surfaces. The actuator is configured to generate thrust in a direction in which the fixed member and the rotating member are made to approach each other such that the engagement teeth mesh with each other. The input member is configured such that torque is input to the rotating member. The control method includes: exerting the torque of the input member on the fixed member and the rotating member such that the fixed member and the rotating member are separated from each other in the axis direction by the input member, when the thrust is exerted on at least one of the fixed member and the rotating member by the actuator so as to make the engagement teeth mesh with each other; estimating an inclination angle of tooth surfaces based on a relative movement amount in the axis direction between the fixed member and the rotating member, and a relative rotational amount between the fixed member and the rotating member; estimating a frictional coefficient of the tooth surfaces based on the inclination angle; and controlling the thrust of the actuator according to the frictional coefficient.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 2:
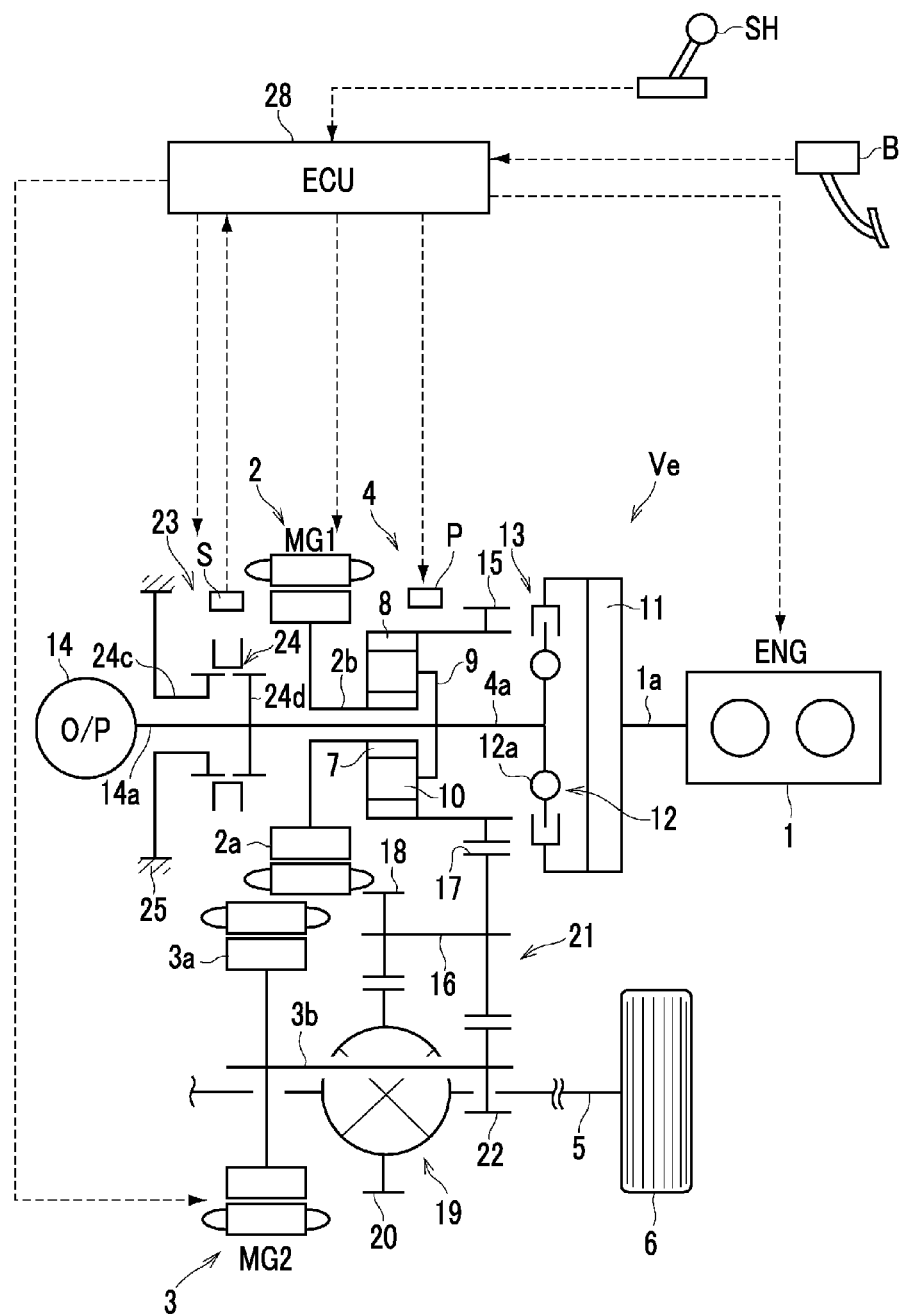
FIG. 2 is a view illustrating an example of a gear train of a vehicle on which a power transmission device using an engaging mechanism related to the embodiment is mounted.

Embodiments will be described below with reference to the drawings. FIG. 2 illustrates an example of a vehicle on which a power transmission device using an engaging mechanism related to the embodiment is mounted. In addition, in FIG. 2, a main electrical connection relationship is illustrated by dashed lines. As illustrated in FIG. 2, a vehicle Ve is equipped with a plurality of drive power sources of a main motive power source 1, a first motor (hereinafter referred to as MG1) 2, and a second motor (hereinafter referred to as MG2) 3. In the example illustrated in FIG. 2, an engine (ENG) as the main motive power source 1 is mounted on the vehicle Ve. The vehicle Ve is configured such that the power output from the main motive power source 1 is divided and transmitted to the first motor 2 and a drive shaft 5 side by a power split mechanism 4. Additionally, the vehicle Ve is configured such that the power generated in the first motor 2 can be supplied to the second motor 3, and a drive power output from the second motor 3 can be added to the drive shaft 5 and a drive wheel 6.

The power split mechanism 4 is a transmission mechanism that transmits torque between the main motive power source 1 and the first motor 2, and the drive wheel 6. The power split mechanism 4 is constituted by a planetary gear mechanism that includes a sun gear 7, a ring gear 8, and a carrier 9. In the example illustrated in FIG. 2, a single pinion type planetary gear mechanism is used. A ring gear 8 that is an internal gear is disposed concentrically with the sun gear 7 of the planetary gear mechanism. A pinion gear 10 that mesh with the sun gear 7 and the ring gear 8 is held by a carrier 9 so as to be able to rotate on its own axis and revolve. In addition, the sun gear 7 is an example of a "first rotation element". The carrier 9 is an example of a "second rotation element". The ring gear 8 is an example of a "third rotation element".

The power split mechanism 4 is disposed on the same axis as the main motive power source 1 and the first motor 2. An input shaft 4a of the power split mechanism 4 is coupled to the carrier 9 of the planetary gear mechanism that constitutes the power split mechanism 4. A flywheel 11 and an output shaft 1a of the main motive power source 1 are coupled to the input shaft 4a. Specifically, the output shaft 1a and the input shaft 4a are coupled to each other via a damper mechanism 12 and a first torque limiter 13 that are attached to the flywheel 11. Hence, the carrier 9 is coupled to the output shaft 1a via the input shaft 4a, the first torque limiter 13, the damper mechanism 12, and the flywheel 11.

The flywheel 11, the damper mechanism 12, and the first torque limiter 13 are provided between the output shaft 1a and the input shaft 4a. The flywheel 11 is coupled to the output shaft 1a. The damper mechanism 12 is attached to a side (left side of FIG. 2) of the flywheel 11 opposite to the main motive power source 1. The damper mechanism 12 is configured similar to a damper mechanism that is generally used. The damper mechanism 12 has the same configuration as, for example, a damper mechanism described in the aforementioned International Publication No. WO2013/140527, and is configured so as to suppress the torsional vibration of the output shaft 1a resulting from torque fluctuation or vibration of the main motive power source 1 by the action of a damper spring 12a.

The first torque limiter 13 is provided at an outer peripheral portion of the damper mechanism 12. The first torque limiter 13 is a mechanism for limiting the magnitude of the torque to be transmitted between the drive wheel 6 and the main motive power source 1. The first torque limiter 13 is configured similar to a torque limiter that is generally used. For example, the first torque limiter 13 is configured such that a friction plate on the output shaft 1a side that is not illustrated and a friction plate on the input shaft 4a side are pressed against each other by a biasing force of a disc spring and the friction plates are frictionally engaged with each other. Additionally, a frictional engagement force between the friction plates is determined according to the biasing force of the disc spring. For that reason, for example, a value of the torque limited by the first torque limiter 13, that is, an upper limit of the torque capable of being transmitted via the first torque limiter 13 is set by adjusting the spring constant of the disc spring.

The first motor 2 is coupled to the sun gear 7 of the planetary gear mechanism. The first motor 2 is disposed adjacent to the power split mechanism 4 and opposite to (on the left side of FIG. 2) the main motive power source 1. A rotor shaft 2b that rotates integrally with a rotor 2a of the first motor 2 is coupled to the sun gear 7. In addition, the rotor shaft 2b, and a rotating shaft of the sun gear 7 are hollow shafts. A rotating shaft 14a of an oil pump 14 is disposed at hollow parts of the rotor shaft 2b and the rotating shaft of the sun gear 7. That is, the rotating shaft 14a is coupled to the input shaft 4a through the above hollow parts.

A first drive gear 15 that is an external gear is formed integrally with the ring gear 8 at the outer peripheral portion of the ring gear 8 of the planetary gear mechanism. Additionally, a counter shaft 16 is disposed parallel to a rotational axis of the power split mechanism 4 and the first motor 2. A counter driven gear 17 that meshes with the above first drive gear 15 is attached to one end part (a right side in FIG. 2) of the counter shaft 16 so as to rotate integrally therewith. Meanwhile, a counter drive gear (final drive gear) 18 is attached to the other end part (the left side in FIG. 2) of the counter shaft 16 so as to rotate integrally with the counter shaft 16. The counter drive gear 18 meshes with a differential gear ring gear (final driven gear) 20 of a differential gear 19 that is a final drive gear. Hence, the ring gear 8 of the power split mechanism 4 is coupled to the drive shaft 5 and the drive wheel 6 via an output gear train 21 consisting of the first drive gear 15, the counter shaft 16, the counter driven gear 17, the counter drive gear 18, and the differential gear ring gear 20 such that power is capable of being transmitted thereto.

The power transmission device of the vehicle Ve is configured such that the torque output from the second motor 3 can be added to the torque to be transmitted from the above power split mechanism 4 to the drive shaft 5 and the drive wheel 6. Specifically, a rotor shaft 3b that rotates integrally with the rotor 3a of the second motor 3 is disposed parallel to the above counter shaft 16. A second drive gear 22 that meshes with the above counter driven gear 17 is attached to a tip (a right end in FIG. 2) of the rotor shaft 3b so as to rotate integrally therewith. Hence, the second motor 3 is coupled to the ring gear 8 of the power split mechanism 4 via the output gear train 21 and the second drive gear 22 as described above such that power is capable of being transmitted thereto. That is, the ring gear 8 is coupled to the drive shaft 5 and the drive wheel 6 via the output gear train 21 with the second motor 3 such that power is capable of being transmitted thereto.

Additionally, the vehicle Ve is provided with a brake pedal B and a parking lock mechanism P that exert braking torque on the drive wheel 6. The parking lock mechanism P is engaged with, for example, the above first drive gear 15, and locks the rotation of the first drive gear 15. The vehicle Ve is provided with a shift lever SH that actuates the parking lock mechanism P. The shift lever SH is configured similar to a shift lever that is generally used. A parking position where the vehicle is set to a stopped state, a reverse position where the vehicle is backwardly driven, a neutral position where transmission of torque to the drive wheel 6 is cut off, and the like in addition to a driving position for forwardly driving the vehicle are included in the shift position to be selected by the shift lever SH. Hence, when the shift position of the shift lever SH is the parking position, the above parking lock mechanism P operates. In addition, the parking lock mechanism P and the brake pedal B are an example of the "brake mechanism". The first drive gear 15 is an example of the "rotating body".

Moreover, the power transmission device of this vehicle Ve is provided with a brake mechanism 23 having a locking function and a limiting function. The brake mechanism 23 is constituted by a tooth brake (engagement brake) 24. The locking function herein means a function of stopping the rotation of the output shaft 1a of the main motive power source 1. Moreover, the limiting function means a function of releasing a locked state and suppressing an overload in the power transmission device when the torque that acts exceeds the upper limit, even in a case where the above locking function is acting after fixed tooth 24a and rotating tooth 24b that constitute the tooth brake 24 engage with each other. The brake mechanism 23 is an example of the "engaging mechanism".

Figure 3:
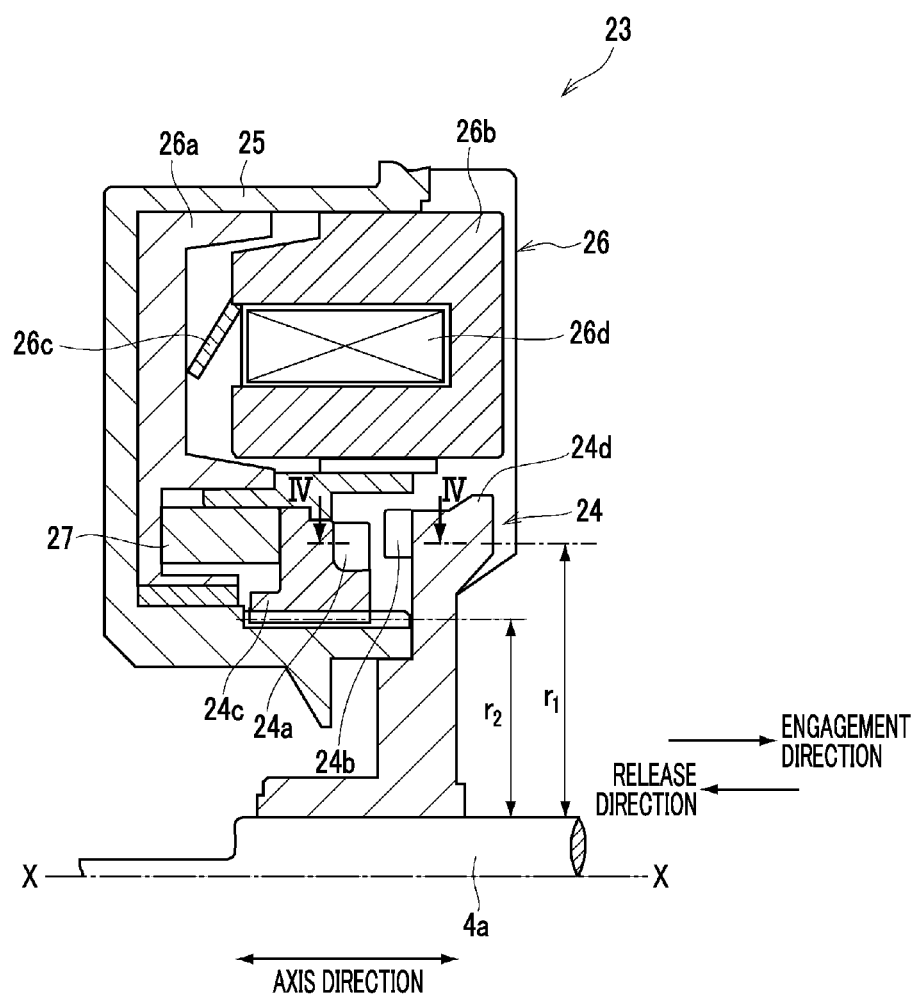
FIG. 3 is a view for explaining a configuration example of the engaging mechanism related to the embodiment.

In the example illustrated in FIG. 2, the brake mechanism 23 is provided between the first motor 2, the second motor 3, the power split mechanism 4, a transmission case 25 that houses the tooth brake 24 and the like therein, the input shaft 4a, and the carrier 9. Additionally, as illustrated in FIG. 3, the tooth brake 24 has a fixed member 24c in which the fixed tooth 24a is provided, and a rotating member 24d in which the rotating tooth 24b is provided, and is configured such that the fixed tooth 24a and the rotating tooth 24b are brought into an engaged state and a released state by the fixed member 24c and the rotating member 24d relatively moving in an axis direction. The fixed tooth 24a and the rotating tooth 24b are an example of "engagement teeth". Additionally, unless particularly described, the "axis direction" shows a direction of a central axis X of the fixed member 24c and the rotating member 24d. The "rotational direction" shows a rotational direction having the central axis λ as a rotation center (refer to FIG. 3).

The fixed member 24c is movably attached to the transmission case 25 by a spline so as to be non-rotatable and movable in the axis direction (rightward-leftward direction in FIG. 3). Additionally, the fixed member 24c is provided to face the rotating member 24d in the axis direction. The rotating member 24d is an annular member, and is disposed coaxially with the input shaft 4a. The rotating member 24d is attached to the input shaft 4a by a spline, and rotates integrally with the input shaft 4a. That is, The fixed member 24c and the rotating member 24d are arranged to face each other on the same axis, is configured such that the fixed tooth 24a and the rotating tooth 24b that are respectively provided on mutually facing surfaces of the fixed member 24c and the rotating member 24d mesh with each other and transmit torque.

Figure 4:
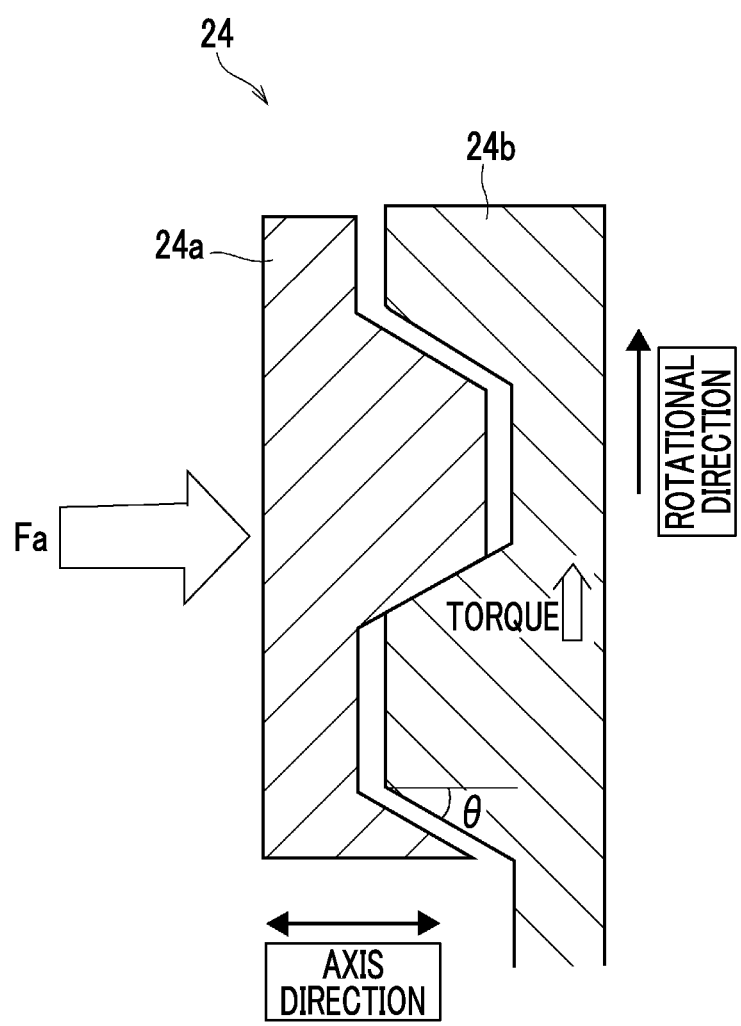
FIG. 4 is a sectional view taken along line IV-IV of the engaging mechanism in FIG. 3.

Additionally, the fixed tooth 24a and the rotating tooth 24b provided in the tooth brake 24, as illustrated in FIG. 4, are constituted by, for example, teeth (or teeth consisting of a triangular shape) of which the sectional shape is trapezoidal. The rotating tooth 24b is formed such that the length of the input shaft 4a in the rotational direction becomes short gradually toward a tip on the fixed tooth 24a, and while the fixed tooth 24a is formed such that the length of the input shaft 4a in the rotational direction becomes short gradually toward a tip on the rotating tooth 24b. That is, the fixed tooth 24a and the rotating tooth 24b are formed so as to be tapered toward the mutually facing surfaces of the fixed member 24c and the rotating member 24d, and the rotating tooth 24b and the fixed tooth 24a mesh with each other on inclined surfaces.

In the axis direction, a direction in which the fixed member 24c moves toward the rotating member 24d is referred to as an "engagement direction", and a direction opposite to the engagement direction is referred to as a "release direction". In FIG. 3, a direction that moves from a left side to a right side is the engagement direction, and a direction that moves from the right side to the left side is the release direction.

An electromagnetic actuator 26 (hereinafter simply referred to as an actuator) is further provided in the brake mechanism 23. The actuator 26 is configured such that the above engagement teeth, that is, the fixed tooth 24a and the rotating tooth 24b mesh with each other and such that thrust is generated in a direction in which the fixed member 24c and the rotating member 24d are made to approach each other, or in one direction. The operation of engagement or release of the fixed tooth 24a and the rotating tooth 24b is actuated by the actuator 26. The actuator 26 is constituted by a movable member 26a, a stationary member 26b, a disc spring 26c, and a coil 26d. The actuator 26 generates thrust Fa that presses the fixed member 24c against the rotating member 24d side as described above by virtue of this configuration. In the description after this, the "thrust Fa" of the actuator 26 is referred to as a "pressing force Fa" that presses the fixed member 24c against the rotating member 24d side.

The movable member 26a and the stationary member 26b are disposed to face each other in the axis direction. In FIG. 3, the movable member 26a is disposed on the left side, and the stationary member 26b is disposed on the right side. Additionally, the disc spring 26c that is a return spring is disposed between the movable member 26a and the stationary member 26b. By energizing the coil 26d, the movable member 26a is attracted to the stationary member 26b to compress the disc spring 26c. The coil 26d is disposed so as to be surrounded by the stationary member 26b. An elastic member 27 is provided between the movable member 26a and the fixed member 24c in the axis direction. The elastic member 27 is configured integrally with the movable member 26a. The elastic member 27 is a return spring that exerts a load on the movable member 26a. The elastic member 27 is configured so as to exert the pressing force Fa of the above actuator 26 against a spring force of the return spring. Hence, the direction of the pressing force Fa of the actuator 26 is a direction in which the fixed tooth 24a of the tooth brake 24 is engaged with the rotating tooth 24b. By increasing the pressing force Fa of the actuator 26, the fixed tooth 24a moves in the engagement direction in which the fixed tooth engages with the rotating tooth 24b. On the other hand, by reducing the pressing force Fa of the actuator 26, the fixed tooth 24a is configured so as to be separated from the rotating tooth 24b by the spring force of the return spring. In addition, the magnitude of the pressing force Fa of the actuator 26 varies according to the value of an current that is applied to the coil 26d.

Figure 5:
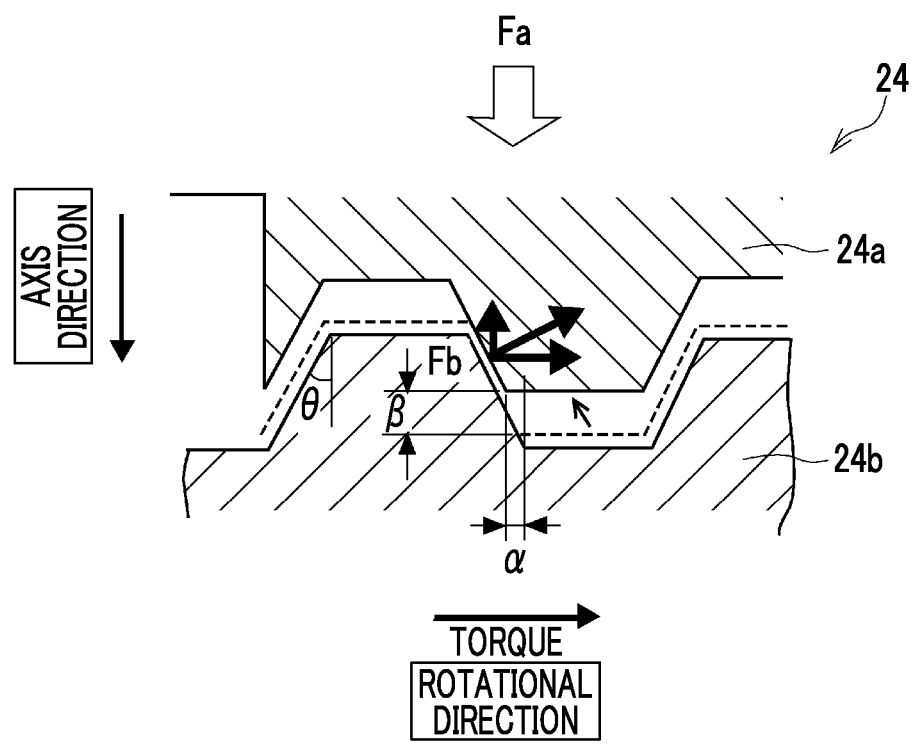
FIG. 5 is a view for explaining a configuration example of a tooth brake related to the embodiment, particularly, a view illustrating a state where the tooth brake is engaging.

In the brake mechanism 23 configured in this way, when the above coil 26d is energized, a magnetic field is generated around the coil 26d. A force that attracts the movable member 26a in the engagement direction is generated due to the generated magnetic field. That is, the movable member 26a is attracted toward the stationary member 26b side. When the movable member 26a is attracted, the elastic member 27 provided between the actuator 26 and the fixed tooth 24*a* is compressed, and the fixed member 24*c* is pressed against the rotating member 24*d* side. Hence, the rotating tooth 24*b* and the fixed tooth 24*a* engage and mesh with each other. In that state, when torque acts on engaging surfaces or contact surfaces (tooth surfaces) of the fixed tooth 24*a* and rotating tooth 24*b*, a component force Fb in the axis direction is generated as illustrated in FIG. 5.

In a case where the component force Fb in the axis direction caused by the torque transmitted to the rotating tooth 24*b* is smaller than the pressing force Fa caused by the actuator 26, the engaged state is maintained. Hence, the rotation of the input shaft 4*a* and the rotation of the output shaft 1*a* and the carrier 9 coupled to the input shaft 4*a* are stopped by actuating the tooth brake 24 to engage the fixed tooth 24*a* and the rotating tooth 24*b* with each other. That is, the tooth brake 24 functions as a locking mechanism.

In contrast, in a case where the component force Fb in the axis direction caused by the torque transmitted to the rotating tooth 24*b* is larger than the pressing force Fa caused by the actuator 26, the engaged state is released. That is, when the fixed member 24*c* and the rotating member 24*d* are relatively separated from each other in the axis direction by a thrust force in the axis direction caused in the tooth surfaces of the engagement teeth (the fixed tooth 24*a* and rotating tooth 24*b*) that mesh with each other, and the engagement between the engagement teeth is released, the transmission of the torque is cut off. That is, in a case where an excessive torque is transmitted to the rotating tooth 24*b*, the fixed tooth 24*a* and the rotating tooth 24*b* are separated from each other and the engaged state therebetween is released, and the tooth brake 24 is brought into a released state. Accordingly, the fixed tooth 24*a* and the rotating tooth 24*b* function as a limiter mechanism. That is, the tooth brake 24 is configured such that the engagement teeth of the rotating member 24*d* and the fixed member 24*c* mesh with each other and transmits torque, and such that the fixed member 24*c* and the rotating member 24*d* are separated from each other in the axis direction and the engagement between the engagement teeth is released and the transmission of torque is cut off in a case where a torque equal to or higher than the upper limit torque capable of being transmitted between the fixed member 24*c* and the rotating member 24*d* is input to the rotating member 24*d*.

In addition, in the example illustrated in this FIG. 3, the actuator 26 is configured so as to actuate the fixed member 24*c* and engage the fixed member with the rotating member 24*d*. On the contrary, however, the actuator 26 may be configured so as to actuate the rotating member 24*d* and engage the rotating member with the fixed member 24*c*.

Additionally, the tooth brake 24 can be fixed to a rear cover (not illustrated) using the brake mechanism 23 as an integral unit. The brake mechanism 23 that constitutes the tooth brake 24 can be housed within the transmission case 25 by attaching the rear cover to the casing 25.

In the above-described hybrid vehicle Ve, driving modes, such hybrid driving mode (HV mode) using the engine 1 as a power source, and an electric driving mode (EV mode) in which driving is performed by driving the first motor 2 and the second motor 3 with the power of a power storage device (not illustrated), are possible. Setting or switching of such respective modes and engagement or release control of the above tooth brake 24 are executed by an electronic control unit (ECU) 28. The ECU 28 is configured using a microcomputer as a main body, and is configured so as to perform calculation using input data or data stored in advance, and a program, and to output the calculation result as a control command signal. The input data are a vehicle speed, a vehicle wheel speed, an accelerator opening degree, the charge residual amount (SOC) of the power storage device, the movement amount of the tooth brake 24, the shift position of the shift lever SH, the amount of stepping of the brake pedal B, and the like, and the data stored in advance are maps that determine the respective driving modes. The ECU 28 outputs a command signal for start or stop of the engine 1, a torque command signal of the first motor 2, a torque command signal of the second motor 3, a torque command signal of the engine 1, an electric current command signal of the actuator 26, and the like as control command signals. In addition, although FIG. 2 illustrates an example in which one ECU 28 is provided, two or more ECUs may be provided, for example, for each device to be controlled or for each control content.

In the hybrid vehicle Ve configured as described above, the locking function and the limiting function can be made compatible with each other by providing the tooth brake 24 as described above. Meanwhile, as described above, a frictional coefficient μ in the contact surfaces of the fixed tooth 24*a* and the rotating tooth 24*b* of the tooth brake 24 varies depending on aged deterioration, and the like. In such a case, there is a concern that deviation or an error may occur in the frictional coefficient μ estimated with the aged deterioration, and eventually the locking function and the limiting function may decrease. Thus, the present embodiment is configured such that the frictional coefficient μ is estimated by estimating the inclination angle θ of the tooth surfaces where the fixed tooth 24*a* and the rotating tooth 24*b* of the above tooth brake 24 come into contact with each other, and the pressing force (thrust) Fa of the actuator 26 is controlled according to the estimated frictional coefficient μ. Hereinafter, a specific example of the control to be executed by the ECU 28 will be described.

Figure 1:
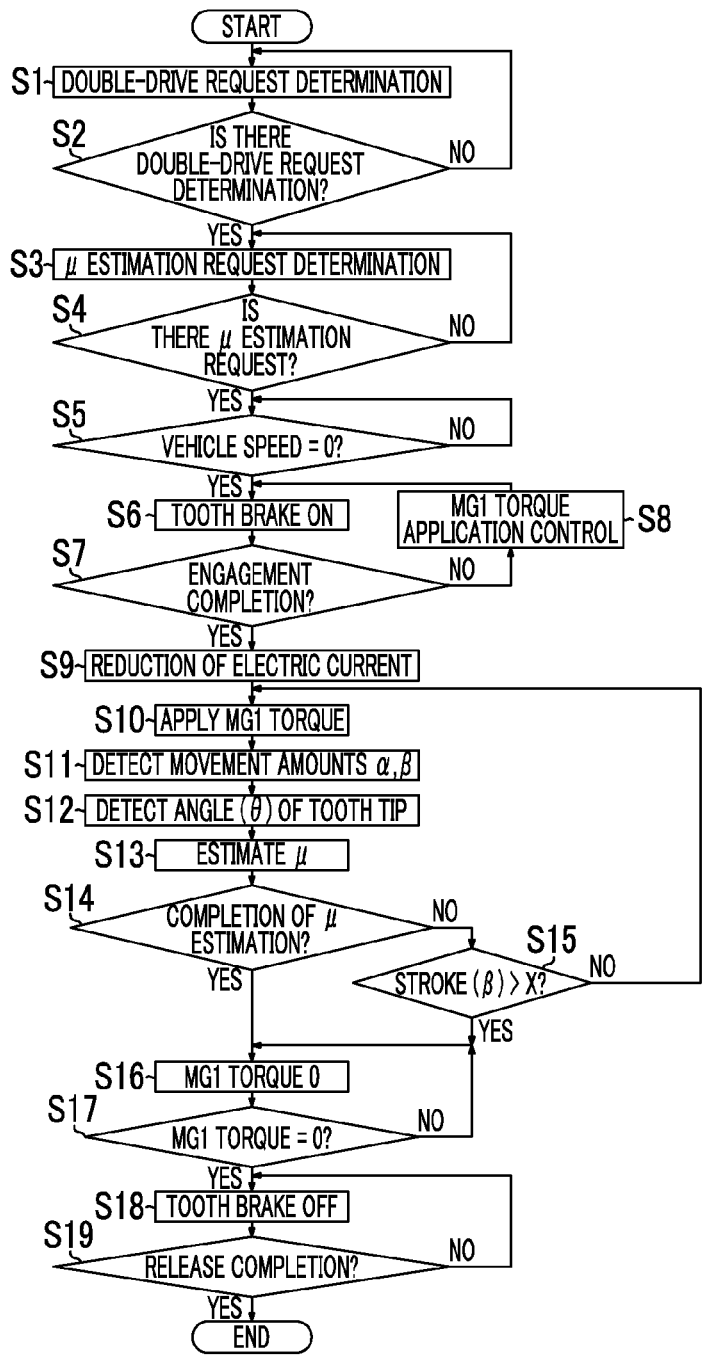
FIG. 1 is a flowchart for explaining a control example to be executed in an embodiment.

FIG. 1 is a flowchart illustrating an example of the control, and particularly a control example for estimating the frictional coefficient μ of the tooth surfaces where the fixed tooth 24*a* and the rotating tooth 24*b* of the tooth brake 24 come into contact with each other. This will be specifically described below.

First, double-drive request determination is performed (Step S1). The double-drive is the electric driving mode (EV driving mode). The electric driving mode is a mode in which the first motor 2 and the second motor 3 are driven as motors with the power of the power storage device and driving is performed with the torque output from the first motor 2 and the second motor 3. In Step S1, the double-drive request is determined from a map or the like that is determined in advance and stored in ECU 28. Subsequently, it is determined whether or not there is the double-drive request (Step S2). In this Step S2, in a case where it is determined in this Step S2 that the answer is negative, that is, there is no double-drive request, Step S1 and Step S2 are repeatedly executed until it is determined that there is the double-drive request.

On the contrary, in a case where it is determined the answer is positive in Step S2, that is, in a case where it is determined that there is the double-drive request, estimated request determination of the frictional coefficient μ is performed (Step S3). The estimated request determination of the frictional coefficient μ, as described above, is an estimated request for the frictional coefficient μ of the tooth surfaces where the fixed tooth 24*a* and the rotating tooth 24*b* of the tooth brake 24 come into contact with each other. In this determination, it is determined whether or not there is the estimated request for the frictional coefficient μ (Step S4). In a case where it is determined that determination on whether or not there is the estimated request for the frictional coefficient μ in this Step S4 is negative, Step S3 and Step S4 is repeatedly executed until it is determined that there is the estimated request for the frictional coefficient μ. The frictional coefficient μ or the inclination angle θ of the tooth surfaces may vary depending on the phase of engagement of the tooth brake 24. Therefore, in the estimated request determination of the frictional coefficient μ in this Step S4, it is preferable to execute the estimated request for the frictional coefficient μ whenever there is the double-drive request in Step S2. Hence, in a case where it is determined in this Step S4 that the answer is positive, that is, in a case where it is determined that there is the estimated request for the frictional coefficient μ, the processing proceeds to Step S5.

In Step S5, It is determined whether or not the vehicle speed is "0". That is, it is determined whether or not the vehicle Ve is in a stopped state. Determination on whether or not this vehicle Ve is in the stopped state is performed by, for example, a vehicle wheel speed sensor or a resolver of the MG2 that is not illustrated. In a case where it is determined in this Step S5 that the answer is negative, that is, in a case where vehicle speed=0 is not established, this Step S5 is repeatedly executed until vehicle speed=0 is established.

On the contrary, in a case where it is determined in this Step S5 that the answer is positive, that is, vehicle speed=0, is established, the tooth brake 24 is brought into an "ON" state (Step S6).

When the tooth brake 24 is brought into the ON state in this Step S6, an electric current is sent through the actuator 26 that presses the fixed member 24c, the fixed member 24c is moved in the axis direction by the actuator 26, and the fixed tooth 24a and the rotating tooth 24b are engaged with each other. That is, the pressing force Fa is exerted on the fixed member 24c and the rotating member 24d by the actuator 26 such that the tooth brake 24 is engaged.

Subsequently, it is determined whether or not the tooth brake 24 that has received an engagement instruction in Step S6 is engaged (Step S7). Specifically, whether or not the engagement is completed is determined by a stroke sensor S attached to the tooth brake 24. In a case where it is determined in this Step S7 that the answer is negative, that is, it is determined that the engagement of the tooth brake 24 is not completed, the torque of the first motor 2 is output and the phase of the tooth brake 24 is shifted (Step S8). This is for shifting the phase to engage the tooth brake 24 by outputting the torque of the first motor 2, for example, because the tooth surfaces of the fixed tooth 24a and the rotating tooth 24b may stop at top surfaces. In addition, in a case where it is determined in this Step S7 that the answer is negative, Step S8 and Step S6 are repeatedly executed until the engagement of the tooth brake 24 is completed.

On the contrary, in a case where it is determined in this Step S7 that the answer is positive, that is, it is determined that the engagement is completed, the electric current applied in the above Step S6 is reduced (Step S9). This is because the tooth brake 24 may not move and the estimation of the frictional coefficient μ may not be able to be performed, even if the attractive force (magnetic force) of the coil 26d of the actuator 26 has too strong with an unchanged electric current after the engagement of the tooth brake 24 is completed, and the first motor 2 outputs a maximum torque. Hence, the tooth brake 24 is easily actuated by lowering the electric current to lower the above attractive force.

Subsequently, when it is determined in Step S7 that the engagement of the tooth brake 24 is completed and the electric current is reduced in Step S9, the torque of the first motor 2 is applied (Step S10). Specifically, the torque of the first motor 2 is applied in the stopped state of the vehicle Ve and in the engagement completion state of the tooth brake 24. That is, torque is input to the rotating member 24d by the first motor 2 such that the fixed member 24c and the rotating member 24d cause a thrust force, with which these members are separated from each other in the axis direction against the pressing force Fa of the actuator 26, in the tooth surfaces of the engagement teeth. Accordingly, the above torque acts on the fixed member 24c and the rotating member 24d. In addition, the torque when applying the torque of the first motor 2 may be applied at a constant rate or at a variable rate. The first motor 2 is an example of an "input member to which torque is input to the rotating member", in the present embodiment.

Subsequently, when the tooth brake 24 begins to move by the torque of the first motor 2 being applied in Step S10, a movement amount α, in the rotational direction, of the input shaft 4a that rotates integrally with the rotating member 24d, and a movement amount β of the fixed member 24c in the axis direction (a separation amount β between the fixed member 24c and the rotating member 24d) are detected (Step S11). The movement amount α and the movement amount β are detected by the stroke sensor S attached to the tooth brake 24.

Subsequently, the inclination angle θ of the contact surfaces (tooth surfaces) of the fixed tooth 24a and the rotating tooth 24b are estimated from the movement amount α, in the rotational direction, of the input shaft 4a that rotates integrally rotates with the rotating member 24d detected in Step S11, and the movement amount β of the fixed member 24c in the axis direction (Step S12). Specifically, the inclination angle can be calculated according to the following arithmetic expression.

$$\theta = \tan^{-1}(\alpha/\beta) \quad (1)$$

In addition, a relationship between the inclination angle θ of the above tooth surfaces, the movement amount α, and the movement amount β is illustrated in FIG. 5.

Then, in Step S13, the frictional coefficient μ is estimated using the value of the inclination angle θ of the tooth surfaces calculated in Step S12. Specifically, the frictional coefficient is calculated from the inclination angle θ of the tooth surfaces calculated by the above Expression (1), the pressing force Fa caused by the actuator, an MG1 torque T, and a pitch circle radius $r_1$ of the engagement teeth of the tooth brake 24, and a spline pitch circle radius $r_2$. When this is simplified and represented by a numerical expression, this can be shown as follows.

$$Fa = (\cos\theta - \mu\cos\theta/\cos\theta + \mu\sin\theta)Fr_1 - \mu Fr_2 \quad (2)$$

In addition, as for the frictional coefficient μ concerning $Fr_1$ and $Fr_2$ of the above Expression (2), the frictional coefficient μ is calculated as an average value or an approximation because μ to assumed is the same.

Subsequently, when the frictional coefficient μ is estimated in Step S13, it is determined whether or not the estimation of the estimated frictional coefficient μ is completed (Step S14). As for determination on whether the estimation of the frictional coefficient μ is completed, for example, a predetermined number of times of estimation of the frictional coefficient μ is performed in a process in which estimation control of the frictional coefficient μ described in the above Steps S10 to Step S13 is executed, or it is determined that the estimation is completed when variations of errors in data of the estimated frictional coefficient μ are within a predetermined range. As the estimated data, an average value or a final value of the data that is estimated by a predetermined number of times is used. In a case where it is determined in this Step S14 that the answer is negative, that is, the estimation of the frictional coefficient μ is not completed, the processing proceeds to Step S15.

In this Step S15, in a case where it is determined that the estimation control of the frictional coefficient μ is not completed in the above Step S14, it is determined whether or not a rotational amount α of the rotating member 24d of the tooth brake 24 or a stroke amount β of the fixed member 24c exceeds a predetermined threshold value X. This has a concern that, for example, when the torque of the first motor 2 continues being applied, the tooth brake 24 may come off and be released and abnormal noise or a shock may be generated. Therefore, when a predetermined stroke amount is detected, it is determined whether or not the estimation control of the above frictional coefficient μ is ended. Hence, in a case where it is determined in this Step S14 that the answer is negative, that is, the stroke amount β or the rotational amount α of the tooth brake 24 is lower than the predetermined threshold value X, Step S10 to Step S14 are repeatedly executed. On the other hand, in a case where it is determined in this Step S15 that the answer is positive, that is, the stroke amount β or the rotational amount α of the tooth brake 24 exceeds the predetermined threshold value X, the torque of the first motor 2 is set to "0" such that the tooth brake 24 does not come off (Step S16).

In this Step S16, as described above, in a case where it is determined in Step S14 that the estimation control of the frictional coefficient μ is not completed and, for example, the stroke amount β exceeds the threshold value X in Step S15, the torque of the first motor 2 is first set to "0", Step S17 and the following steps to be described below is executed, and the estimation control of the frictional coefficient μ is ended. This is for lowering the torque of the first motor to "0" such that the tooth brake 24 does not come off as described above. That is, in a case where the movement amount β by which the fixed member 24c and the rotating member 24d are separated from each other in the axis direction exceeds the predetermined value X, the torque of the first motor 2 to be input to the rotating member 24d described in Step S10 is lowered. That is, the torque exerted on the fixed member 24c and the rotating member 24d is lowered. On the other hand, in a case where it is determined that the determined result is positive in the above-described Step S14, that is, also in a case where the estimation control of the frictional coefficient μ is completed, the processing proceeds to Step S16 and the torque of the first motor 2 is set to "0".

Subsequently, it is determined whether or not the torque of the first motor 2 executed in Step S16 was set to "0" (Step S17). That is, it is determined whether or not MG1 torque=0 is established. In a case where it is determined in this Step S17 that the answer is negative, that is, in a case where MG1 torque=0 is not established, Step S16 is repeatedly executed until MG1 torque=0 is established.

On the contrary, in a case where it is determined in this Step S17 that the answer is positive, that is, MG1 torque=0 is established, the tooth brake 24 is brought into an OFF state, that is, released (Step S18). Then, the tooth brake 24 is brought into the OFF state by the control executed by Step S17 and Step S18, and it is determined whether or not the release is completed (Step S19). In a case where it is determined in this Step S19 that the answer is negative, that is, the tooth brake, 24 is not released, Step S18 is repeatedly executed until the release is completed. On the contrary, in a case where it is determined that the tooth brake 24 is released, the control of the flowchart illustrated in this FIG. 1 is ended.

Figure 6:
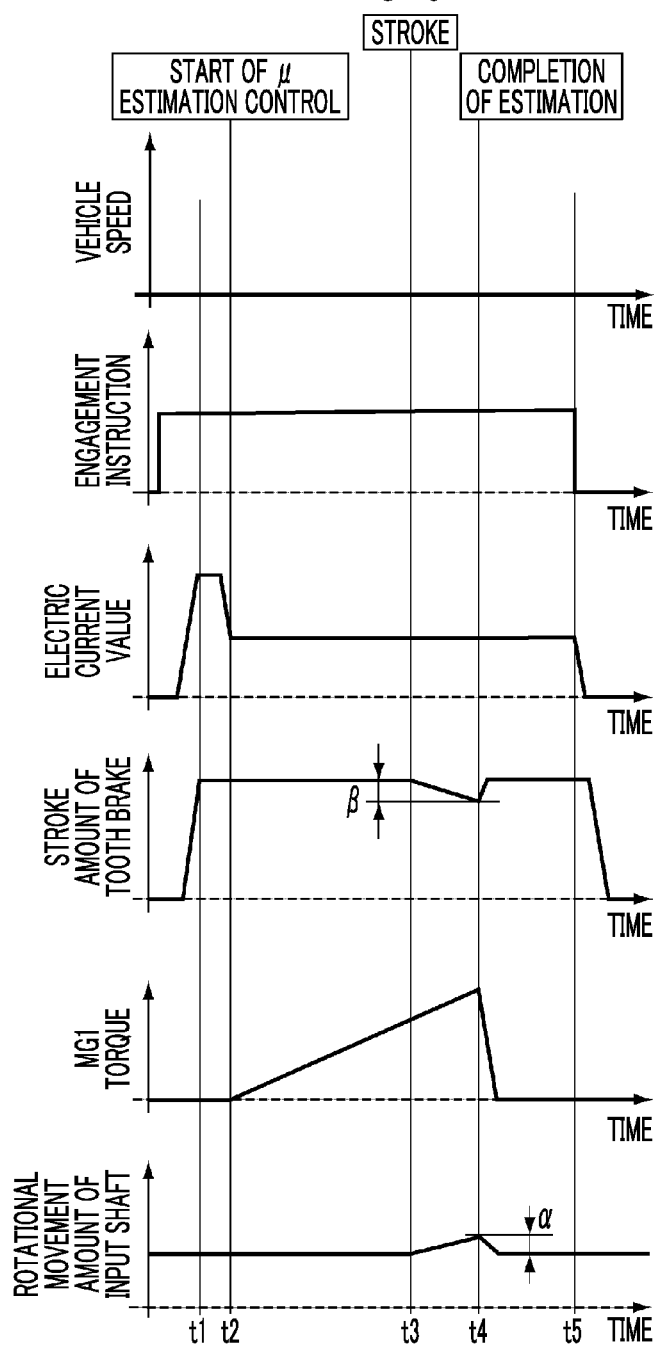
FIG. 6 is a time chart illustrating an example of changes in a vehicle speed, an engagement instruction to a brake mechanism, a current value, the stroke amount of the tooth brake, an MG1 torque, and the rotational movement amount of an input shaft, in a case where the control example of FIG. 1 is executed.

FIG. 6 is a view for explaining a time chart when the above-described control example of FIG. 1, and particularly, a time chart illustrating an example of changes in the vehicle speed, an engagement instruction to the brake mechanism 23, a current value, the stroke amount β of the tooth brake 24, the MG1 torque, and the rotational movement amount α of the input shaft, in a case where the control example of FIG. 1 is executed.

First, as illustrated in FIG. 6, at a time point t1, in order to estimate the inclination angle θ of the tooth surfaces that are the contact surfaces of the tooth brake 24, and the frictional coefficient μ, an engagement instruction to the brake mechanism 23 is made. According to the engagement instruction to the brake mechanism 23, an electric current is output by the actuator 26, and the value of the electric current begins to increase. Additionally, the stroke amount β of the tooth brake 24 begins to increase.

Subsequently, when the engagement of the brake mechanism 23 is completed, as shown in Step S9, the electric current value of the actuator is reduced (time point t2). Hence, the estimation control of the frictional coefficient μ is started at this time. Additionally, the torque of MG1 is applied from this time point t2. That is, in order to estimate the inclination angle θ of the tooth surfaces, the torque of MG1 is gradually applied. In addition, this MG1 torque may be a negative torque without being limited to a positive torque as illustrated in FIG. 6.

Subsequently, the torque of MG1 increases gradually from the time point t2, and the tooth brake 24 begins to move to a release side. That is, the fixed member 24c begins to move in the direction in which the fixed member is separated from the rotating member 24d in the axis direction, and the input shaft 4a that rotates integrally the rotating member 24d in the rotational direction (time point t3). Subsequently, the movement amount β (stroke amount) of the tooth brake 24 and the movement amount α in the rotational direction the input shaft 4a that rotates integrally with the rotating member 24d, which are described in Step S11, are detected due to the above movement beginning. Then, as shown in Step S12, the movement amount α and the movement amount β are substituted in the above Expression (1), and the inclination angle θ of the tooth surface is estimated.

Subsequently, the frictional coefficient μ is estimated by the above Expression (2) described in Step S13, using the estimated and obtained inclination angle θ of the tooth surfaces. Specifically, the frictional coefficient is estimated from the inclination angle θ of the tooth surfaces, the pressing force Fa caused by the actuator 26, the MG1 torque T, and the pitch circle radius $r_1$ of the engagement teeth of the tooth brake 24, and the spline pitch circle radius $r_2$.

Then, when the estimation control of the frictional coefficient μ is completed (time point t4), the torque of MG1 applied from the time point t2 decreases to "0" with the end of the estimation control. Along with this, the stroke amount β of the tooth brake 24, and the movement amount α, of the rotational direction, of the rotating member 24d that rotates integrally with the input shaft 4a decreases.

Then, when the torque of MG1 is set to "0", the engagement instruction to the brake mechanism 23 is released, and along with this, an electric current value caused by the actuator 26 also decreases toward "0" (time point t5). Then, the stroke amount β of the tooth brake 24 reaches "0" when the electric current value is "0".

In this way, the inclination angle θ of the tooth surfaces in the contact surfaces of the fixed tooth 24a and the rotating tooth 24b that constitute the tooth brake 24 is estimated, and the frictional coefficient μ is estimated using the estimated inclination angle θ of the tooth surfaces. For that reason, even if there is an individual difference or aged deterioration, the inclination angle θ and the frictional coefficient μ of the tooth surfaces can be precisely estimated. The locking function and the limiting function can be precisely made compatible with each other by controlling the pressing force (thrust) Fa of the actuator 26, that is, controlling the electric current to be applied to the coil 26d, according to the estimated inclination angle θ and the estimated frictional coefficient μ.

Hereinafter, another embodiment will be described. In the above-described control example of FIG. 1, the estimation of the frictional coefficient μ in the contact surfaces of the fixed tooth 24a and the rotating tooth 24b of the tooth brake 24 has been described. In the example illustrated in FIG. 7, in addition to this, an example having a configuration in which the output of MG2 is controlled according to the stop situation of the vehicle Ve, for example in a case where the vehicle Ve is in the stopped state by a foot brake or the like, in the process in which the frictional coefficient μ is estimated, is illustrated. Hereinafter, a flowchart of the control example will be described. In addition, the same steps as those of the above-described control example of FIG. 1 will be designated by the same reference signs, and the description thereof will be simplified or omitted.

First, Step S1 to Step S10 are the same as those of the above control example, and in a case where the frictional coefficient μ is estimated after the double-drive determination, the tooth brake 24 is engaged. Then, after the engagement of the tooth brake 24 is completed, the electric current value of the actuator 26 is reduced, and the torque of MG1 is applied (from Step S1 to Step S10).

Subsequently, it is determined whether or not the shift position is at the parking position or the vehicle Ve is in the stopped state by a hill-hold brake (Step S101). This parking position means a state where the shift position where the driving range is selected as the parking position. Additionally, the hill-hold brake means, for example, a brake function of performing control such that the braking force exerted on the drive wheel 6 is maintained (held) at a force equal to or higher than a predetermined braking force for several seconds, even if the foot brake is detached, for example, in a case where an acceleration sensor or the like detects whether or not the vehicle Ve is on a slope and the sensor has detected the slope. That is, the drive wheel 6 is locked by maintaining the braking force that acts on the drive wheel 6.

Hence, in a case where it is determined in this Step S101 that the answer is negative, that is, the vehicle Ve is in the stopped state except the parking position or the hill-hold brake, the torque of MG2 is output (Step S102). The torque of MG1 may be transmitted to the drive wheel 6 by a braking force which the transmission of the torque to the drive wheel 6 is controlled, in a case where the shift position is the parking position or the vehicle Ve is stopped by methods other than the hill-hold brake, for example, by the foot brake. That is, in the case of the foot brake operated by the amount of stepping of the brake pedal B by a driver, the torque of the above MG1 may be transmitted to the drive wheel 6 depending on the amount of operation of the foot brake. Hence, in order to prevent the torque of MG1 from being transmitted to the drive wheel 6 during the estimation control of the frictional coefficient μ, the control is performed such that the output torque of MG2 is transmitted to the ring gear 8. Specifically, when the frictional coefficient μ of the tooth surfaces is estimated in a state where the braking force of the foot brake or the like is exerted, the torque of MG1 is output, and the torque of MG2 is exerted in a direction opposite to the direction of the torque of MG1 transmitted to the drive wheel 6 by outputting the torque of the MG1. In short, the output torque of MG2 is exerted in the direction opposite to the direction of the output torque of MG1. Accordingly, since the torque of MG1 can be canceled by the torque of MG2, the vehicle Ve can be prevented from moving against a driver's will.

On the contrary, in a case where it is determined in this Step S101 that the answer is positive, that is, the shift position is the parking position, that is, the vehicle Ve is in the stopped state in the state of the hill-hold brake, the inclination angle θ of the tooth surfaces is estimated similar to the above-described Step S12 FIG. 1. That is, in this Step S101, in a case where the shift position is the parking position or the vehicle Ve is stopped by the hill-hold brake, the control of outputting the torque of MG2 in the above Step S102 is not performed. As for this, a rotating body (for example, the first drive gear 15) in a power transmission path between the ring gear 8 and the drive wheel 6 is locked by the parking lock mechanism in which the shift position operates depending on the parking position. That is, since the torque of MG1 is not transmitted to the drive wheel 6 in a case where the shift position is the parking position, it is not necessary to output the torque of MG2. Similarly, in a case where the vehicle Ve is stopped by the hill-hold brake, the braking force is relatively large compared to a braking force at normal time, that is, the braking force exerted on the drive wheel 6 is maintained at a force equal to or higher than a predetermined braking force, the torque of MG1 is not transmitted to the drive wheel 6. In short, even in a case where the vehicle Ve is stopped by the hill-hold brake and even in a case where the shift position is the parking position, the control of Step S102 is not executed similarly. In other words, the vehicle is configured so as to strop the control of outputting the torque of MG2 in Step S102.

Then, the processing proceeds to Step S11 and the following steps, subsequent to Step S101 or Step 102, and the estimation control of the inclination angle θ of the tooth surfaces and the estimation control of the frictional coefficient μ are made similar to the above control example of FIG. 1 (from Step S11 to Step S19).

Figure 7:
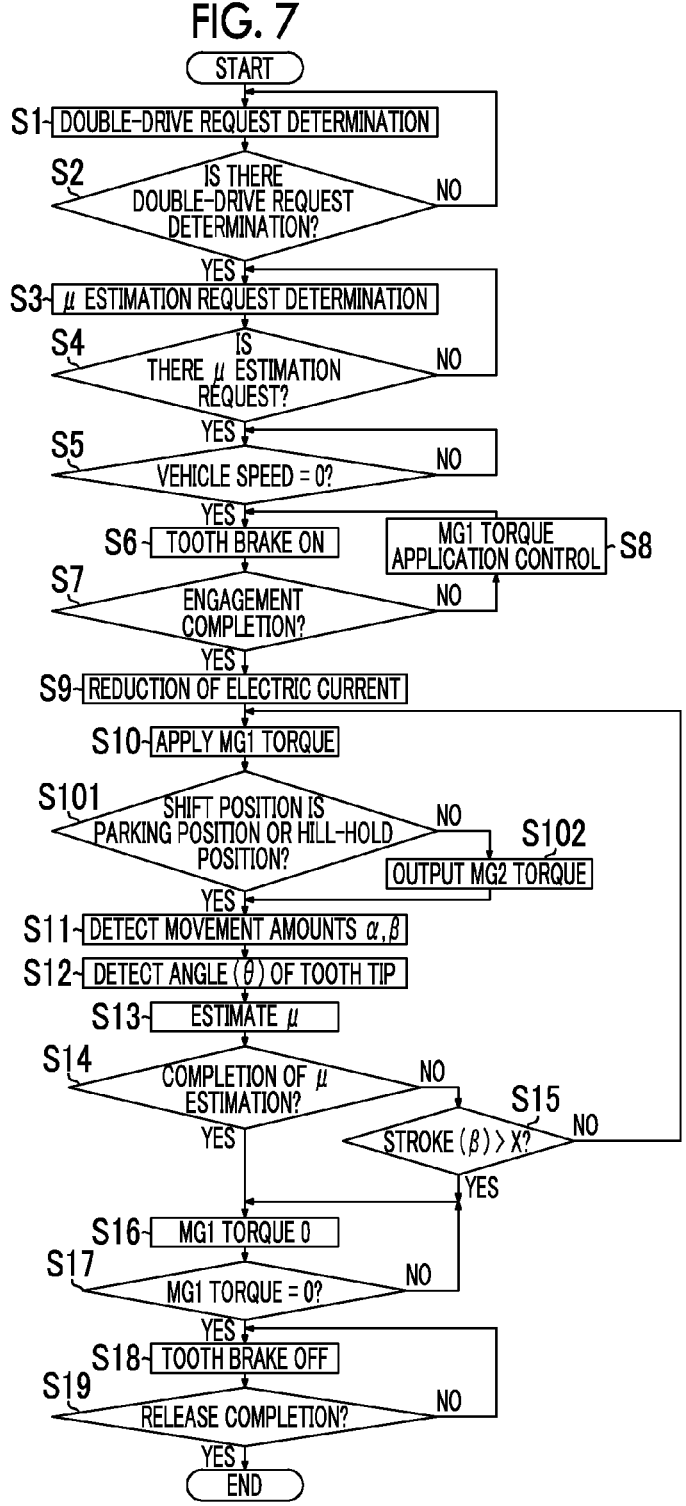
FIG. 7 is a flowchart for explaining another control example.
Figure 8:
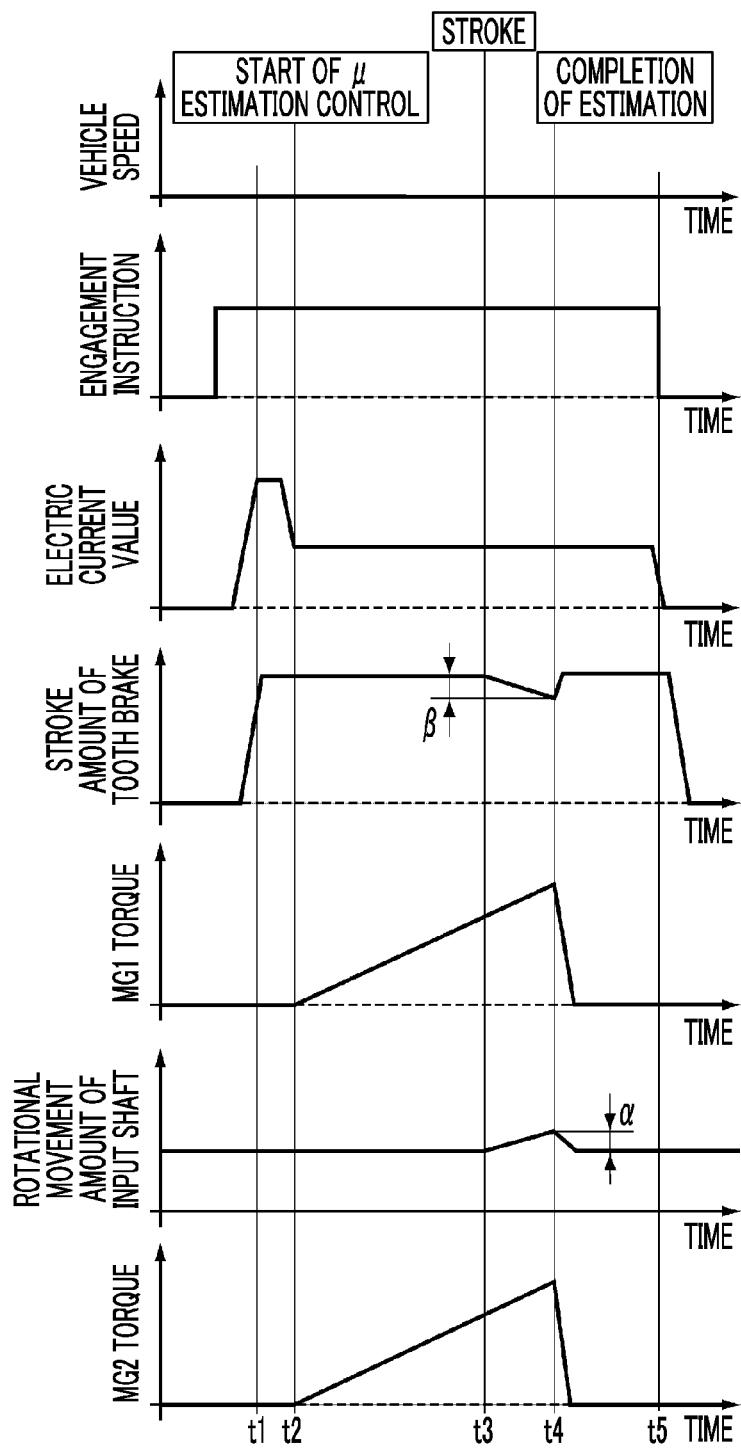
FIG. 8 is a time chart illustrating an example of changes in the vehicle speed, the engagement instruction to the brake mechanism, the electric current value, the stroke amount of the tooth brake, the MG1 torque, the rotational movement amount of an input shaft, and an MG2 torque, in a case where the control example of FIG. 7 is executed.

Additionally, FIG. 8 is a view illustrating a time chart in the control example of FIG. 7, and a time chart in which an example of changes in the torque of MG2 is added to the time chart (FIG. 6) in the above-described control example of FIG. 1. Hence, the description regarding the same changes will be omitted.

Specifically, torque is gradually increased such that the output torque of MG2 is exerted in the direction opposite to the output torque of MG1, that is, the torque of MG2 cancels the reaction force of MG1 and a drive power is not transmitted to the drive wheel 6, from the time point t2 when the estimation control of the frictional coefficient μ is started. Then, the torque of MG2 is applied till a time point t4 when the estimation control of the frictional coefficient μ ends, and the torque of MG2 also decreases to "0" with the end of the estimation control.

Figure 9:
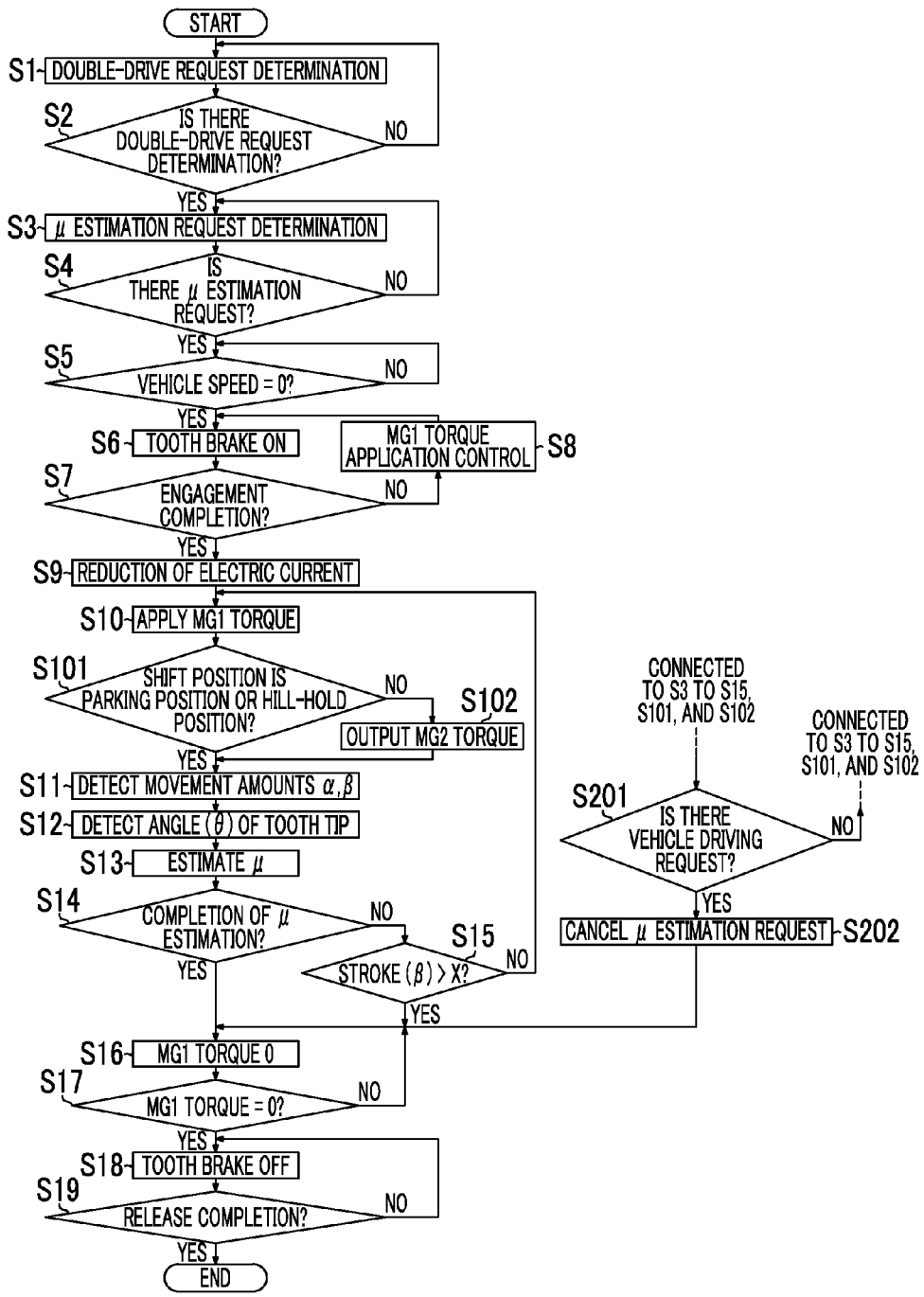
FIG. 9 is a flowchart for explaining still another control example.

Subsequently, still another embodiment will be described. In any of the above-described control examples illustrated in FIGS. 1 and 7, the estimation control of the frictional coefficient μ is executed in a case where the vehicle Ve is in the stopped state. However, when the estimation control of the frictional coefficient μ is executed, there is a case where the vehicle Ve is intended to drive due to a driver's request or the like. FIG. 9 illustrates a control example in such a case. Hereafter, a flowchart of this control example will be described. In addition, the same steps as those of the above control examples of FIGS. 1 and 7 will be designated by the same reference signs, and the description thereof will be simplified or omitted.

First, in Step S1 and Step S2, it is determined that there is double-drive determination, and it is determined whether or not there is any driving request for the vehicle Ve while executing control of any of Step S3 to Step S15, Step S101, and Step S102 of the above-described control examples of FIGS. 1 and 7 (Step S201). A driving request for the vehicle Ve by a driver is determined by this. As examples of this determination, there are a case where the shift position is shifted from the parking position to a driving position, a case where the accelerator opening degree is positive, a case where the foot brake is in an OFF state, and the like. Hence, in a case where it is determined in this Step S201 that the answer is negative, that is, there is no accelerator operation or the like and there is no vehicle driving request, control is executed as it is, similar to the flowcharts illustrated in FIGS. 1 and 7.

On the contrary, in a case where it is determined in this Step S201 that the answer is positive, that is, there is a vehicle driving request, the estimated request for the frictional coefficient μ is canceled (Step S202). This avoids causing discomfort to a driver by giving priority to a driver's driving request in a case where there is the driving request in the above-described driving request determination example or the like. Additionally, since precise estimation of the inclination angle θ and the frictional coefficient μ cannot be performed even if the estimation control of the frictional coefficient μ is performed in this state, the estimated request for the frictional coefficient μ is canceled.

Specifically, in a case where there is a driving request while executing control of any of Step S3 to Step S15, Step S101, and Step S102, the control under the execution is stopped and the processing proceeds to Step S16. That is, the torque of MG1 is lowered to "0". Then, the processing proceeds to Step S16 and the following steps, and the tooth brake 24 is released similar to the above control examples of FIGS. 1 and 7 (from Step S16 to Step S19).

In addition, in this control example illustrated in FIG. 9, a step of releasing the tooth brake 24 after canceling the estimated request for the frictional coefficient μ of Step S202 is illustrated. However, the engaged state of the tooth brake 24 may be maintained. That is, the estimation control of the frictional coefficient μ may be stopped by a driver's request, and the release and engagement states of the tooth brake 24 do not matter.

In this way, in any of the above-described embodiments, the inclination angle θ of the tooth surfaces in the contact surfaces of the fixed tooth 24a and the rotating tooth 24b that constitute the tooth brake 24 is estimated, and the frictional coefficient μ is estimated using the estimated inclination angle θ of the tooth surfaces. Hence, according to this disclosure, the inclination angle θ and the frictional coefficient μ of the tooth surfaces can be precisely estimated, and the locking function and the limiting function can be precisely made compatible with each other by controlling the pressing force (thrust) Fa of the actuator 26 according to the estimated inclination angle θ and the estimated frictional coefficient μ. Moreover, power consumption rate can be improved by controlling the torque of MG2 according to the stopped state of the vehicle Ve. In a case where there is a driver's driving request, discomfort to a driver can be avoided by giving priority to the driving request.

According to the above configuration, the thrust of the actuator is exerted in the direction in which the fixed member and the rotating member are made to approach each other such that the engagement tooth of the rotating member mesh with the engagement tooth of the fixed member mutually, torque is input to the rotating member in the state, and the torque is exerted on the fixed member and the rotating member. In such a case, a component force in the axis direction according to the above torque is generated in the tooth surface of each of the engagement teeth that mesh with each other, and if the component force exceeds the thrust of the actuator, the fixed member and the rotating member relatively move in the axis direction. Additionally, when the above torque is applied, the fixed member and the rotating member relatively rotate simultaneously with the relative movement thereof in the axis direction. That is, the tooth surfaces that come into contact with each other relatively move in an inclination direction of the tooth surfaces. Since the movement amounts of the fixed member and the rotating member in the axis direction and the rotational direction in that case becomes amounts according to the inclination angle of the tooth surfaces, the inclination angle of the tooth surfaces is obtained from these movement amounts. Since the thrust caused by the actuator and the above torque are known, the frictional coefficient of the tooth surfaces is obtained on the basis of these thrust and torque and the inclination angle. The upper limit torque is set depending on the frictional coefficient, and the thrust caused by the actuator. That is, since the frictional coefficient of the tooth surfaces is obtained on the basis of the inclination angle of actual engagement teeth having an individual difference, aged deterioration, or the like, the engaging mechanism having an excellent torque limiting function can be obtained.

According to the above configuration, the above estimated frictional coefficient is estimated based on the above estimated inclination angle of the tooth surfaces, the thrust caused by the actuator, and the torque acting on the fixed member and the rotating member. For that reason, even in a case where the angle of the tooth surfaces varies due to aged deterioration or the like, or has variations from that in the first stage, this frictional coefficient can be precisely estimated. Hence, since the thrust of the actuator can be controlled according to the estimated frictional coefficient, it is possible to more precisely make the locking function and the limiting function compatible with each other.

According to the above configuration, in a case where the relative movement amount of the fixed member and the rotating member in the axis direction exceeds a predetermined value (threshold value) when the above estimation control of the frictional coefficient is performed, the torque acting on the fixed member and the rotating member is lowered. Hence, the engagement tooth provided in the fixed member and the engagement tooth provided in the rotating member are not completely released. For that reason, a driver can avoid unintended abnormal noise or an unintended shock.

According to the above configuration, the torque of the first motor is cancelled by outputting the torque of the second motor, in a case where the vehicle is stopped by the brake mechanism, such as a foot brake. Specifically, the second motor is coupled to the power transmission path between the drive wheel and the third rotation element. The torque of the second motor is transmitted to the third rotation element such that the output torque of the second motor opposes the torque of the first motor transmitted to the third rotation element when the above-described frictional coefficient of the tooth surfaces is estimated. That is, the output torque of the second motor is exerted in the direction opposite to the output torque the first motor transmitted to the drive wheel. For that reason, it is possible to avoid that the torque of the first motor is transmitted to the drive wheel. As a result, it is possible to avoid that the vehicle begins to move against a driver's will.

According to the above configuration, for example, in a case where the shift position is the parking position and the vehicle stops, the control of outputting the torque of the above second motor is not executed. That is, when the shift position is the parking position, the parking lock mechanism that locks a rotating body within the power transmission path between the third rotation element and the drive wheel operates. For that reason, it is not necessary to output the torque of the second motor when the output torque of the first motor is not transmitted to the drive wheel. Hence, consumption of the power of the second motor can be reduced, and eventually, power consumption rate can be improved.

According to the above configuration, for example, in a case where the vehicle is stopped by the hill-hold brake that locks the drive wheel by maintaining or holding the braking force that acts on the drive wheel, the control of outputting the torque of the above second motor is not executed. That is, in a case where the vehicle is stopped by the hill-hold brake, the output torque of the first motor is not transmitted to the drive wheel similar to when shift position is the parking position. Therefore, it is not necessary to output the torque of the second motor. For that reason, consumption of the power of the second motor can be reduced, and eventually, power consumption rate can be improved.

According to the above configuration, in a case where there is a driving request for the vehicle during the estimation control of the frictional coefficient, this estimation control is stopped. That is, priority is given to the driving request. For example, during the estimation control of the frictional coefficient, in a case where there is a shift change or the vehicle is operated to accelerator ON from a stopped state, a driving request may be made. For that reason, in a case where there is a driving request, a driver can perform driving comfortable by stopping the estimation control of the inclination angle of the tooth surfaces and the estimation control of the frictional coefficient.

Although the plurality of embodiments of this disclosure have been described above, this disclosure is not limited to the above-described examples, and may be appropriately changed within a range where the object of this disclosure is achieved. For example, in any of the above-described respective embodiments, after the tooth brake 24 is engaged, the tooth brake 24 is made to slide on the release side by applying the torque of MG1. That is, the fixed member 24c and the rotating member 24d are separated from each other, and the inclination angle θ and the frictional coefficient μ of the tooth surfaces of the fixed tooth 24a and the rotating tooth 24b are estimated from the separation amount β, and the rotational amount α of the rotating member 24d. In contrast, the inclination angle θ of the tooth surfaces may be estimated by making the tooth brake 24 slide to the engagement side instead of the operation of making the tooth brake 24 slide to the release side. In such a case, the above control is executed from a state where the fixed tooth 24a and the rotating tooth 24b are not completely engaged with each other. For example, after the fixed tooth 24a and the rotating tooth 24b of the tooth brake begin to mesh with each other, the tooth brake 24 is moved to the engagement side, and the inclination angle θ and the frictional coefficient μ of the tooth surface of the fixed tooth 24a and the rotating tooth 24b are estimated similar to the case on the release side, from the movement amount β, and the rotational amount α of the rotating member 24d. That is, the tooth brake 24 is made to slide on the engagement side, the inclination angle θ of the tooth surfaces is estimated from the movement amount, and the frictional coefficient μ is estimated from the inclination angle θ of the tooth surfaces. Then, the pressing force (thrust) Fa of the actuator 26 is controlled according to the estimated inclination angle θ and the estimated frictional coefficient μ.

Additionally, in the above-described respective embodiments, description is made using the vehicle Ve in which the rotor shaft 2b of the first motor 2 and the rotor shaft 3b of the second motor 3 as described in FIG. 2 are disposed in parallel as a target. In contrast, the power transmission device in the vehicle Ve can also be applied to, for example, a hybrid vehicle Ve (not illustrated) in which the rotor shaft 2b of the first motor 2, and the rotor shaft 3b of the second motor 3 are disposed on the same axis.

Moreover, in any of the above-described respective embodiments, a configuration in which the engine is mounted on the main motive power source 1 of the vehicle Ve is illustrated. That is, an example in which the vehicle Ve is the hybrid vehicle equipped with the engine with the first motor 2 and the second motor 3 as the drive power sources is illustrated. In contrast, the power transmission device in this vehicle Ve can also be applied to, for example, a vehicle Ve (not illustrated) equipped with a motor as a main motive power source 1. That is, the power transmission device can also be applied to an electric automobile equipped with three sets of motors together with the first motor 2 and the second motor 3, as the drive power sources.

What is claimed is:
1. A control device for a vehicle,
the vehicle including an engaging mechanism,
the engaging mechanism including a fixed member, a rotating member, engagement teeth, an actuator, and an input member,
the rotating member being disposed to face the fixed member on the same axis as the fixed member,
the fixed member and the rotating member being configured to mesh with each other to transmit torque,
the fixed member and the rotating member being configured to be separated relative to each other in an axis direction such that the meshing between the engagement teeth is released and the transmission of the torque is cut off, when the torque equal to or higher than an upper limit torque capable of being transmitted between the fixed member and the rotating member is input to the rotating member,
the engagement teeth being respectively provided on mutually facing surfaces of the fixed member and the rotating member, and the engagement teeth having shapes that are tapered toward the mutually facing surfaces,
the actuator being configured to generate thrust in a direction in which the fixed member and the rotating member are made to approach each other such that the engagement teeth mesh with each other, and
the input member being configured such that torque is input to the rotating member, the control device comprising an electronic control unit configured to:
control the torque of the input member to act on the fixed member and the rotating member such that the fixed member and the rotating member are separated from each other in the axis direction by the input member, when the thrust is exerted on at least one of the fixed member and the rotating member by the actuator so as to make the engagement teeth mesh with each other;
estimate an inclination angle of tooth surfaces based on a relative movement amount in the axis direction between the fixed member and the rotating member, and a relative rotational amount between the fixed member and the rotating member;
estimate a frictional coefficient of the tooth surfaces based on the inclination angle; and
control the thrust of the actuator according to the fictional coefficient.

2. The control device according to claim 1,
wherein the electronic control unit is configured to estimate the frictional coefficient based on the estimated inclination angle of the tooth surfaces, the thrust generated by the actuator, and torque acting on the fixed member and the rotating member.

3. The control device according to claim 1,
wherein the electronic control unit is configured to lower the torque acting on the fixed member and the rotating member, when the relative movement amount in the axis direction between the fixed member and the rotating member exceeds a predetermined value.

4. The control device according to claim 1,
wherein the vehicle further includes a planetary gear mechanism, a drive wheel, a brake mechanism, a first motor, and a second motor,
the planetary gear mechanism includes at least three rotation elements of a first rotation element to which the first motor is coupled, a second rotation element to which the rotating member is coupled, and a third rotation element coupled to the drive wheel,
the brake mechanism is configured to exert braking torque on the drive wheel,
the second motor is coupled to a power transmission path between the drive wheel and the third rotation element,
wherein the electronic control unit is configured to estimate the frictional coefficient when torque from the first motor is output while the braking torque is exerted on the drive wheel by the brake mechanism, and
the electronic control unit is configured to control the output torque of the second motor such that torque opposing the torque transmitted to the third rotation element is transmitted to the third rotation element by outputting torque from the first motor, when the electronic control unit estimates the frictional coefficient.

5. The control device according to claim 4,
wherein the brake mechanism is a parking lock mechanism configured to lock a rotating body within the power transmission path between the third rotation element and the drive wheel, and
the electronic control unit is configured to stop the control of the output torque of the second motor, when a shift position is a parking position where the parking lock mechanism is actuated.

6. The control device according to claim 4,
wherein the electronic control unit is configured to execute hill-hold brake control for maintaining a braking force exerted on the drive wheel by the brake mechanism at a predetermined braking force or higher, and
the electronic control unit is configured to stop the control of the output torque of the second motor when the hill-hold brake control is executed.

7. The control device according to claim 1,
wherein the electronic control unit is configured to stop control of estimating the frictional coefficient, when a driving request for the vehicle is required during execution of the control for estimating the frictional coefficient.

8. A control method for a vehicle,
the vehicle including an engaging mechanism,
the engaging mechanism including a fixed member, a rotating member, engagement teeth, an actuator, and an input member,
the rotating member being disposed to face the fixed member on the same axis as the fixed member,
the fixed member and the rotating member being configured to mesh with each other to transmit torque,
the fixed member and the rotating member being configured to be separated relative to each other in an axis direction such that the meshing between the engagement teeth is released and the transmission of the torque is cut off, when the torque equal to or higher than an upper limit torque capable of being transmitted between the fixed member and the rotating member is input to the rotating member,
the engagement teeth being respectively provided on mutually facing surfaces of the fixed member and the rotating member, and the engagement teeth having shapes that are tapered toward the mutually facing surfaces,
the actuator being configured to generate thrust in a direction in which the fixed member and the rotating member are made to approach each other such that the engagement teeth mesh with each other, and
the input member being configured such that torque is input to the rotating member,
the control method comprising:
exerting the torque of the input member on the fixed member and the rotating member such that the fixed member and the rotating member are separated from each other in the axis direction by the input member, when the thrust is exerted on at least one of the fixed member and the rotating member by the actuator so as to make the engagement teeth mesh with each other;
estimating an inclination angle of tooth surfaces based on a relative movement amount in the axis direction between the fixed member and the rotating member, and a relative rotational amount between the fixed member and the rotating member;
estimating a frictional coefficient of the tooth surfaces based on the inclination angle; and
controlling the thrust of the actuator according to the frictional coefficient.

* * * * *